US006418079B1

(12) United States Patent
Fleure

(10) Patent No.: US 6,418,079 B1
(45) Date of Patent: Jul. 9, 2002

(54) METHOD OF REDUCING HARMONIC INTERFERENCE WHILE USING OVERLAPPING SOURCE POINT SEISMIC RECORDING TECHNIQUES

(75) Inventor: Thomas John Fleure, Houston, TX (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 09/393,756

(22) Filed: Sep. 10, 1999

(51) Int. Cl.[7] .................................................. G01V 1/00
(52) U.S. Cl. .............................. 367/40; 367/41; 367/43
(58) Field of Search ........................... 367/189, 21, 40, 367/41, 43

(56) References Cited

U.S. PATENT DOCUMENTS 5,410,517 A  * 4/1995  Andersen ...................... 367/75
6,161,076 A  * 12/2000 Barr et al. .................... 702/17
6,181,646 B1 * 1/2001  Bouyoucos et al. ........ 367/189

OTHER PUBLICATIONS

SEG Extended Abstracts, 1996 International Conference, Denver; Slip–sweep acquisition; H. Justus Rozemond, Petroleum Development Oman, Muscat, the Sultanate of Oman, ACQ 3.2.*

The Leading Edge, Aug., 1998; Recent developments in 3–D acquisition techniques using vibroseis in Oman; Jan Wams and Justus Rozemond, Petroleum Development Oman LLC, Muscat, Oman; pp. 1053–1063.

* cited by examiner

Primary Examiner—Edward Lefkowitz
Assistant Examiner—Anthony Gutierrez
(74) Attorney, Agent, or Firm—Madan, Mossman & Sriram, P.C.

(57) ABSTRACT

Segmenting the spectral distribution of overlapped vibratory signals improves the efficiency of data acquisition while providing reduced harmonic distortion in the time zones of interest. Two identical sweep segments are used. Each sweep segment includes an earlier low frequency sweep and a later high frequency sweep, the individual sweeps having substantially no overlap in frequency except for tapering. The high frequency sweep in each pair starts before the end of the low frequency sweep with an overlap in time that is selected to avoid harmonics from the low frequency sweep. Correlation of the recorded signal separately with the low frequency sweep and the high frequency sweep gives data sets in which individual portions of the desired data are recoverable with the harmonic distortion largely separated from the desired data. The individual portions of the desired data are then spliced to give a broadband response of the earth. In an alternate embodiment of the invention, groundforce signals or accelerometer signals from the base plate or the reaction mass of the vibrators are measured and filters are derived relating the measured (reference) signals to a desired short duration wavelet. The derived filters are applied to the recorded data and the resulting filtered data sets are combined to give a broadband response of the earth.

14 Claims, 5 Drawing Sheets

METHOD OF REDUCING HARMONIC INTERFERENCE WHILE USING OVERLAPPING SOURCE POINT SEISMIC RECORDING TECHNIQUES

BACKGROUND OF THE INVENTION

1. Field of the Invention

This invention relates to the field of geophysical prospecting and, more particularly, to a method for generating seismic vibrator data using overlapping sweeps.

2. Background of the Art

In the oil and gas industry, geophysical prospecting techniques are commonly used to aid in the search for and evaluation of subterranean hydrocarbon deposits. Generally, a seismic energy source is used to generate a seismic signal that propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

One type of geophysical prospecting utilizes an impulsive energy source, such as dynamite or a marine air gun, to generate the seismic signal. With an impulsive energy source, a large amount of energy is injected into the earth in a very short period of time. Accordingly, the resulting data generally have a relatively high signal-to-noise ratio, which facilitates subsequent data processing operations. On the other hand, use of an impulsive energy source can pose certain safety and environmental concerns.

Since the late 1950s and early 1960s, a new type of geophysical prospecting, generally known as "VIBROSEIS"® prospecting, has been used. Vibroseis prospecting employs a land or marine seismic vibrator as the energy source. In contrast to an impulsive energy source, a seismic vibrator imparts a signal into the earth having a much lower energy level, but for a considerably longer period of time.

The seismic signal generated by a seismic vibrator is a controlled wavetrain (i.e., a sweep) which is applied to the surface of the earth or in the body of water or in a borehole. Typically, a sweep is a sinusoidal vibration of continuously varying frequency, increasing or decreasing monotonically within a given frequency range, which is applied during a sweep period lasting from 2 to 20 seconds or even more. The frequency may vary linearly or nonlinearly with time. Also, the frequency may begin low and increase with time (upsweep), or it may begin high and gradually decrease (downsweep).

The seismic data recorded during Vibroseis prospecting (hereinafter referred to as "vibrator data") are composite signals, each consisting of many long, reflected wavetrains superimposed upon one another. Since these composite signals are typically many times longer than the interval between reflections, it is not possible to distinguish individual reflections from the recorded signal. However, when the seismic vibrator data is cross-correlated with the sweep signal (also known as the "reference signal"), the resulting correlated data approximates the data that would have been recorded if the source had been an impulsive energy source.

The amount of energy injected into the earth during a conventional vibrator sweep is governed by the size of the vibrator and the duration of the sweep. Given current practical limitations on both vibrator size and sweep duration, it is usually necessary to generate several sweeps at each source point. Each sweep is typically followed by a listen-time during which the vibrator is not sweeping, but reflection energy is still being received by the seismic detectors. Data resulting from each sweep are then cross-correlated with the reference signal for that sweep, and the resulting individual data traces are summed or "stacked" to obtain the final composite data trace for the source point. A significant portion of the time required for each source point is associated with the listen time between sweeps. Obviously, the efficiency of Vibroseis prospecting could be significantly improved by eliminating part or all of this listen time.

Another problem with conventional Vibroseis prospecting results from the fact that vibrators generate harmonic distortion as a result of nonlinear effects in the vibrator hydraulics and the ground's nonlinear reaction to the force exerted by the vibrator base plate, with the second and third harmonics accounting for most of the distortion. These harmonics are present in the recorded data and lead to trains of correlated noise, known as harmonic ghosts, in the correlated data. These harmonic ghosts are particularly troublesome in the case of downsweeps where they occur after the main correlation peak (i.e., positive lag times) and, therefore, can interfere with later, hence weaker, reflections. In the case of upsweeps, harmonic ghosts are somewhat less troublesome because they precede the main correlation peak (i.e., negative lag times). Nevertheless, harmonic ghosts can cause difficulties in processing and interpreting data from upsweeps as well as from downsweeps.

U.S. Pat. No. 5,410,517 issued to Andersen discloses a method for cascading or linking vibrator sweeps together to form a cascaded sweep sequence and optionally eliminating the listen period between successive sweeps. The initial phase angle of each individual sweep segment within a sweep sequence is progressively rotated by a constant phase increment of about 360/N degrees, where N is the number of sweep segments within the sweep sequence. Either the correlation reference sequence or the vibrator sweep sequence, but not both, contains an additional sweep segment positioned and phased so as to substantially suppress harmonic ghosts during correlation. When the additional sweep segment is included at the end of the vibrator sweep sequence, it increases the total acquisition time. If the correlation reference sequence includes the additional sweep segment, it complicates the processing in that the additional sweep segment has to be input at negative time giving a nonstandard correlation operator.

Rozemond discloses a method of seismic acquisition using multiple vibrators using the so-called "slip-sweep" method. The method consists of a vibrator (or a vibrator group) sweeping without waiting for the previous vibrator's sweep to terminate. Correlation, which acts as a time-frequency filter, then extracts the individual records. A significant reduction in overall acquisition time is obtained. This is more efficient than the cascaded sweep since there is no need to wait for the end of a sweep before starting the next sweep. The reduction in overall acquisition time comes at the cost of increased harmonic distortion since the harmonics from the second sweep will correlate with the primary signals of the first sweep.

There is a need for an invention that acquires data with increased efficiency by using overlapping sweeps while providing some measure of protection against harmonics. The present invention satisfies this need.

SUMMARY OF THE INVENTION

The present invention is a method for increasing the efficiency of Vibroseis data acquisition using overlapping sweep signals while providing some protection against harmonic distortion. Two identical pairs of sweep segments are used with a possible overlap in time between the pairs. Each pair of sweep segments includes an earlier low frequency sweep and a later high frequency sweep, the individual sweeps having substantially no overlap in frequency except for tapering. The high frequency sweep in each pair starts before the end of the low frequency sweep with the start time selected so that the harmonics from the low frequency sweep fall outside the data window associated with the high frequency sweep. As a result of this, when the recorded signal from the two pairs of sweep segments is separately correlated with the low frequency sweep and the high frequency sweep, individual portions of the desired data are recovered with the harmonic distortion separable from the desired data. The individual portions of the desired data are then spliced to give a broadband response of the earth.

In an alternate embodiment of the invention, reference signals such as groundforce signals, signals from the motion of the vibrator base plate or signals from the motion of the vibrator reaction mass are measured. Filters are derived relating the reference signals to a desired short duration wavelet. The derived filters are applied to the recorded data and the resulting filtered data sets are combined to give a broadband response of the earth.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENTS

Figure 1:
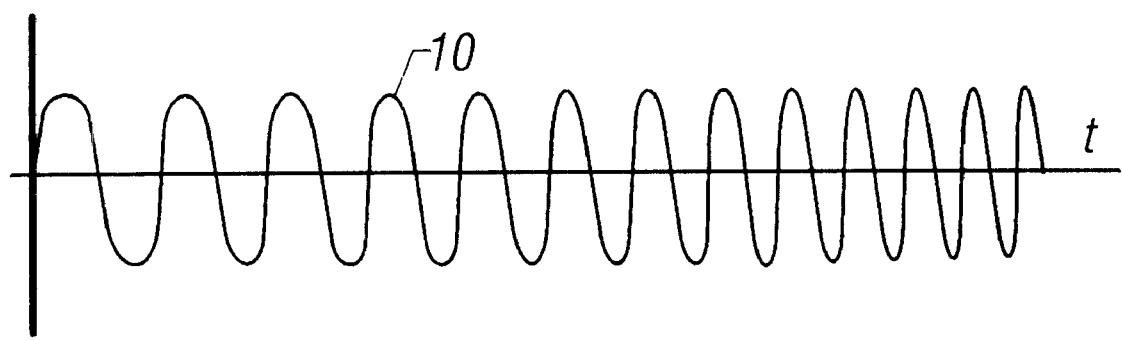
FIG. 1 (PRIOR ART) is an example of a Vibroseis upsweep signal
Figure 2:
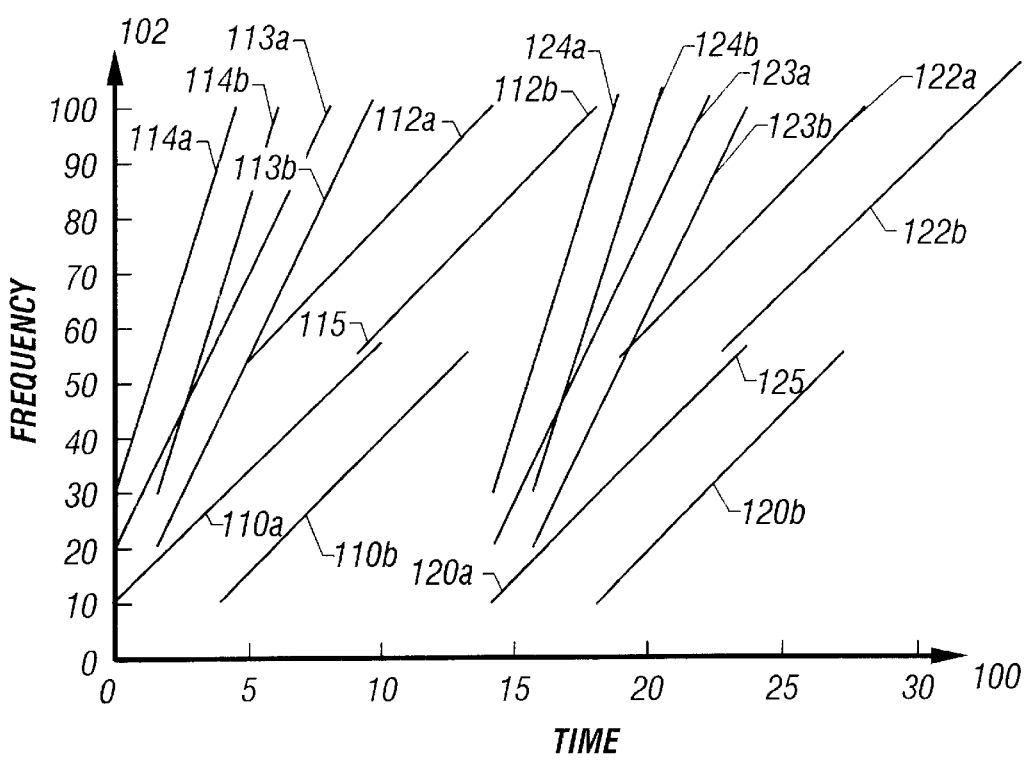
FIG. 2 is a time-frequency plot of the sweep signals of an embodiment of the present invention.

Referring now to FIG. 1 (PRIOR ART), a typical swept frequency signal 10 from a vibratory source is illustrated. The signal is a sinusoid in which the frequency increases with time and in a plot of frequency vs. time, may be characterized by a line 110a as shown in FIG. 2. The abscissa 100 is time and the ordinate 102 is the frequency of the sweep signal. A line such as 110a indicates that the frequency of the signal is increasing linearly with time. For illustrative purposes only and not by way of limitation, an exemplary frequency and time scale is indicated on FIG. 2. In this example, the sweep 110a starts at time zero with a frequency of 10 Hz. and ends at time 9.2 seconds with a frequency of 56 Hz. For brevity, in the rest of the application, when the term "sweep" is used with reference to a line such as 110a, it is understood that what is being discussed is a sweep that may be represented by a line such as 110a.

The low frequency sweep 110a together with a high frequency sweep 112a comprises a pair of overlapping sweeps that make up a sweep segment of the present invention. The second sweep 112a starts at 9.2 seconds with a frequency of 54 Hz. and ends at 18.4 seconds with a frequency of 100 Hz. The use of only two overlapping sweeps is for illustrative purposes only and is not intended to be a limitation: those versed in the art would recognize that more than two sweep segments could be used. The use of substantially equal bandwidths of the first and second sweeps is also not intended to be a limitation. Also indicated in FIG. 2 are lines delineating the ends 110b and 112b of listen times corresponding to the sweep signals 110a and 112b. For illustrative purposes, the listen time is 4 seconds. This is selected on the basis of prior knowledge of the greatest depth of interest from which seismic signals are to be processed. In the example shown, the second sweep is started so that the sum of start time for the second sweep and the listen time is coincidentally equal to the end time of the first sweep: this is not intended to be a limitation and in actual practice, the start time of the second sweep could be earlier or later than the time indicated in FIG. 2. The main consideration is that the start time of the second sweep (and the start frequency of the second sweep) lie outside a region 113a–113b defining the second harmonic of the first sweep. Time lines 113a and 114a corresponding to the second and third harmonics of the sweep 112a are also shown in FIG. 2. The second harmonic time line 113a starts at the same time as the fundamental 110a but at twice the frequency, i.e., 20 Hz in the present example., while the third harmonic time line 114a starts at three times the frequency, i.e., 30 Hz in the present example. FIG. 2 also shows a 1.5 seconds window, denoted by 113b and 114b after the second and third harmonics. Those versed in the art would recognize that in most cases, the strongest component of harmonic distortion is that due to early portions of the signal: accordingly, a window of 1.5 seconds is sufficient in most cases for harmonic analysis. As can be seen, the time windows associated with the second and third harmonics are outside the fundamental time window. Not shown in FIG. 2 are the fourth and higher harmonics of the low frequency sweep: those versed in the art would recognize that in most instances, the second and third harmonics are the most dominant in terms of their effect on processed vibrator data.

A second sweep segment including a pair of sweeps 120a and 122a is also shown in FIG. 2, along with the associated listen times 120b and 122b, and the harmonic windows 123a–123b and 124a–124b corresponding to the second and third harmonics of the low frequency sweep. Also shown is a possible overlap in time 125 between the end of the low frequency sweep 120a and the end of the listen gate 122b of the high frequency sweep. As discussed above with reference to the first sweep segment, the start time of the second, high frequency, sweep is selected to lie outside the time window associated with harmonics of the first sweep.

In the present invention, the two pairs of sweeps as indicated in FIG. 2 are applied to two or more vibrators or vibratory groups. In a preferred embodiment, the two vibrators or vibratory groups are at spaced-apart locations. With this arrangement, a vibrator or vibratory group that is used to generate the low frequency sweep of the first sweep segment is used to generate the high frequency sweep of the second sweep segment. With this arrangement, a complete range of frequencies is generated by each vibrator or vibratory group. The signals propagate into the earth and are reflected therein by reflecting horizons wherever there is a change in the acoustic impedance of the subterranean rocks. The reflected signals are detected by suitable detectors and are processed to give indications of the positions of the reflecting horizons.

In conventional vibratory data processing, the reflected signals are compressed by cross-correlation with a reference signal, such as indicated in FIG. 1. Upon cross correlation, the resulting processed signal approximates the impulse response of the earth, i.e., data that would have been recorded if the source had been an impulsive energy source.

In the present invention, the recorded signal is first compressed by cross-correlation with a reference low frequency sweep signal, 10–56 Hz in the present example. When this is done, the frequency characteristics of the resulting processed data may be schematically represented by FIG. 3.

Figure 3:
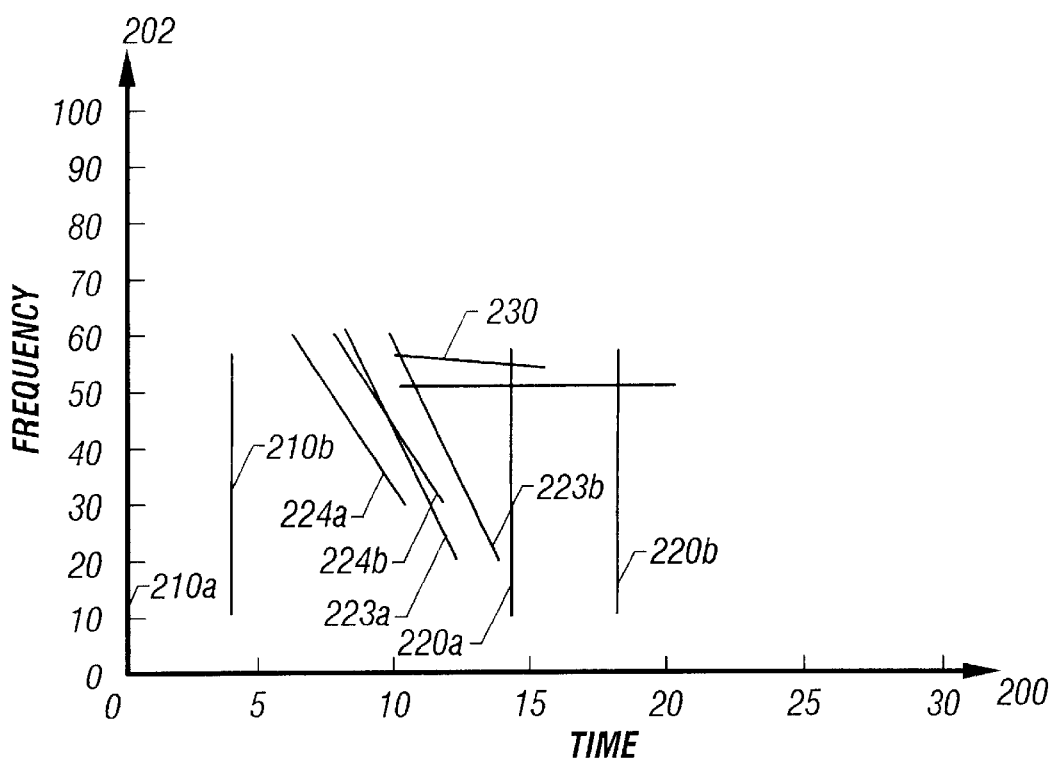
FIG. 3 is a time-frequency plot of the results of correlating the sweep signals of FIG. 1 with a reference low frequency sweep.

The abscissa 200 of FIG. 3 is time and the ordinate 202 is the frequency. The result of correlating first low frequency reference signal with the first low frequency sweep and its associated listening gate 110a–110b appears in the zone denoted by 210a and 210b. This corresponds to four seconds of data (the listening time) with a bandwidth of 10–56 Herz, which is the bandwidth of the low frequency sweep. The result of correlating first low frequency reference signal and the second low frequency sweep and its associate listening gate 120a–120b appears in the zone denoted by 220a and 220b. The correlation of the low frequency reference signal with the second harmonic 123a–123b from the second low frequency sweep appear within the window 223a–223b. The correlation of the low frequency reference signal with the third harmonics 124a–124b from the second low frequency sweep appear within the window 224a–224b. Finally, 230 is a result of the small overlap in frequencies of the reference low frequency sweep signal and the second high frequency sweep signal 122a–122b.

The next step in the invention is to cross correlate the recorded data with a reference high frequency sweep signal, 54–100 Hz in the present case. The result is denoted in FIG. 4. As before, the abscissa 300 is time while the ordinate 302 is frequency. The first high frequency sweep and the associated listening gate 112a–112b appear after correlation with the high frequency reference signal in the zone denoted by 312a and 312b. This corresponds to four seconds of data (the listening time) with a bandwidth of 54–100 Herz, which is the bandwidth of the high frequency sweep. The second high frequency sweep and the associate listening gate 122a–122b appear in the zone denoted by 322a and 322b. The second harmonics from the first high frequency sweep 113a–113b appear within the window 313a–313b. The third harmonics from the first low frequency sweep 114a–114b appear within the window 314a–314b. The second harmonics from the second low frequency sweep 123a–123b appear within the window 323a–323b. The third harmonics from the second low frequency sweep 124a–124b appear within the window 324a–324b. Finally, 330 is a result of the small overlap in frequencies of the reference high frequency sweep signal and the first low frequency sweep signal 110a–110b while 331 is a result of the small overlap in frequencies of the reference high frequency sweep signal with the second low frequency sweep signal 120a–120b.

Figure 4:
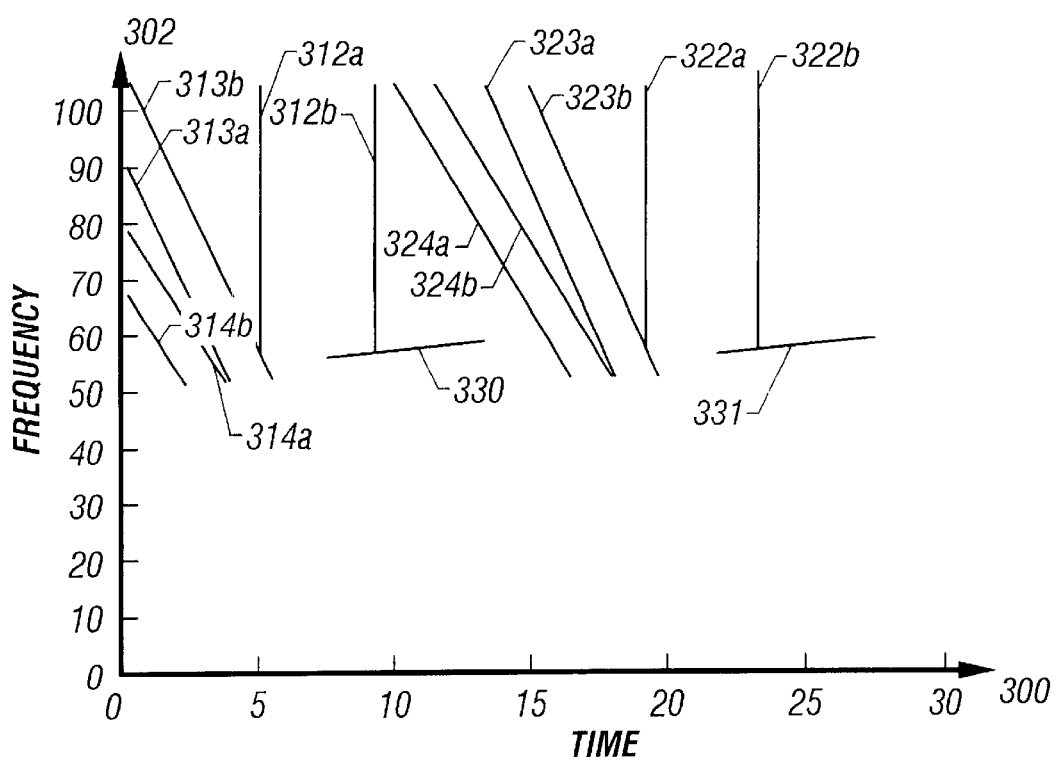
FIG. 4 is a time-frequency plot of the results of correlating the sweep signals of FIG. 1 with a reference high frequency sweep.

The desired impulse response of the earth at the location of the first vibratory source is then obtained by combining the data from the gate 210a–210b of FIG. 3 with the data from the gate 322a–322b of FIG. 4. Similarly, the desired impulse response of the earth at the location of the second vibratory source is obtained by combining the data from the gate 220a–220b of FIG. 3 with the data from the gate 312a–312b of FIG. 4.

For the example given above, the total acquisition time is approximately 33 seconds. The data acquired are the equivalent of two sweeps, each 18.4 seconds long with an associated listen time of 4 seconds each, for a total of 44.4 seconds. This method accordingly reduces the acquisition time by approximately 25%, something that leads to a significant savings in cost over conventional acquisition methods and about a 10% savings over the method of Andersen.

Figure 5:
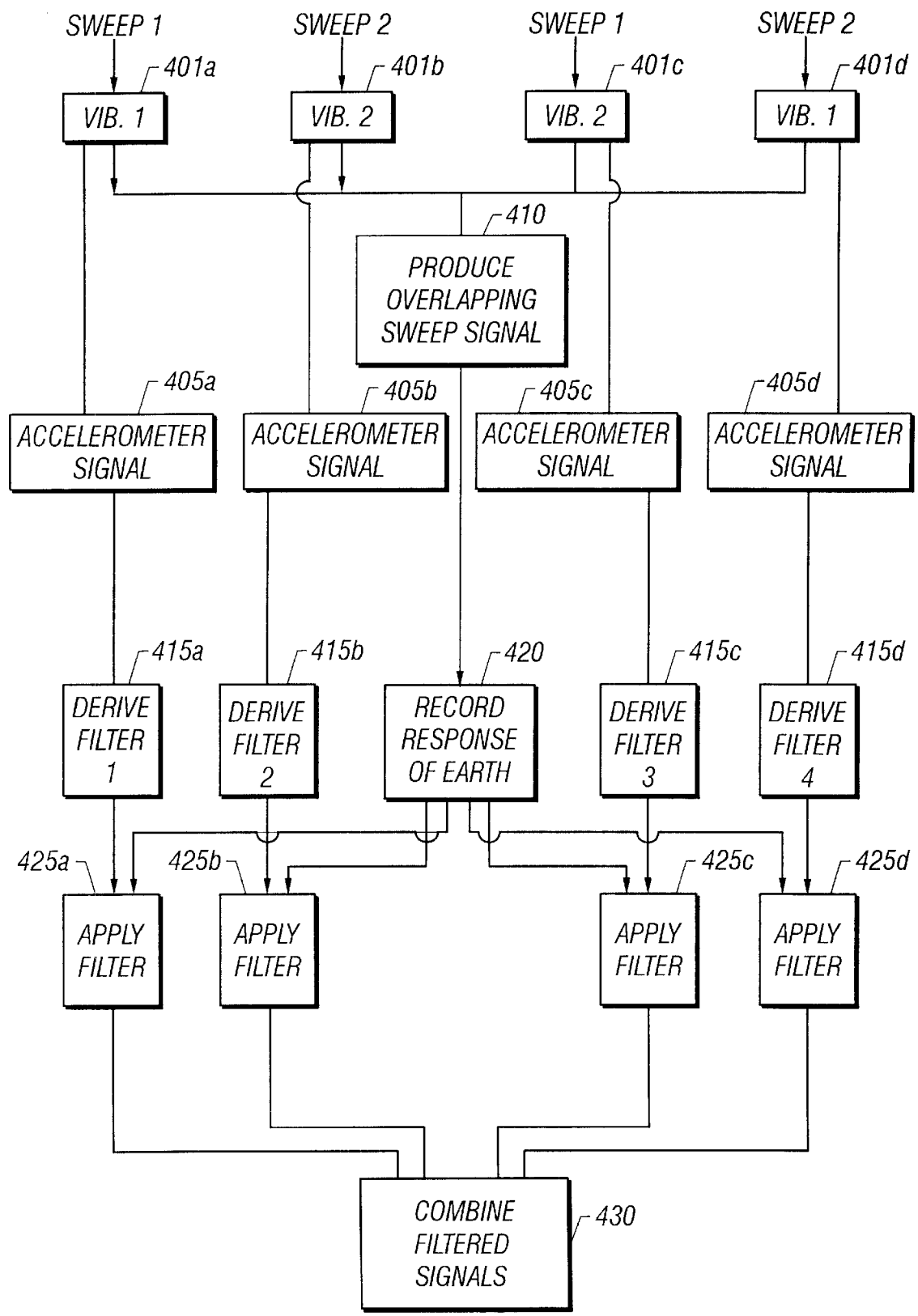
FIG. 5 illustrates the steps of using an alternate embodiment of the invention using a measured reference signal.

Those versed in the art would recognize that other methods besides compressed via crosscorrelation a reference signal may be used to recover the desired impulse response of the earth. U.S. Pat. No. 5,550,786, the contents of which are fully incorporated here by reference, discloses a method of processing vibratory data wherein accelerometers are used to measure the motion of the base plate of a vibrator and/or the motion of the reaction mass that is part of the vibrator. These measured signals are minimum phase relatives of the actual signals that are generated into the subsurface by a vibrator. These measured signals are used in an alternate embodiment of the present invention. A filter is derived that relates the accelerometer signal to a desired wavelet, such as a Klauder wavelet. This filter is then applied to the recorded data set to give time-frequency time displays comparable to those of FIGS. 3 and 4. This is done four times, i.e., for the low frequency sweep and the high frequency sweep for the first vibrator and the second vibrator respectively. The resulting four sets of filtered data are then combined using appropriate segments from the individual filtered outputs. This is schematically depicted in FIG. 5.

401a and 401b show the first and second (the low and high frequency) sweeps for vibratory source 1 and 2 respectively while 401c and 401d show the first and second sweeps for the second and first vibratory source respectively. As discussed above, these are used to produce overlapping sweep segments 410 that propagate into the earth. 405a–405d are the recorded accelerometer signals, either at the base plate or the reaction mass, corresponding to the sweeps 401a–401d respectively. For each of these, a filter is derived 415a–415d relating the accelerometer signals to a desired wavelet using a method such as that described in the '786 patent. The four filters are applied 425a–425d to the response of the earth 420 produced by the overlapping sweep signals 410. Those versed in the art would recognize that by combining the outputs of selected portions of the outputs of filters 425a–425d, the desired response of the earth is obtained. The desired portions of the output of filter 425a would correspond to the region 210a–210b in FIG. 3, the desired portion of the output of filter 425b corresponds to the region 312a–312b in FIG. 4, the desired portion of the output of filter 425c corresponds to the region 322a–322b in FIG. 4 while the desired portion of the output of filter 425d corresponds to the region 220a–220b in FIG. 3.

Those versed in the art would recognize that the method described in the '786 patent and used in the embodiment above does not compensate for the effects of harmonic distortion. The problem of harmonic distortion is addressed in an alternate embodiment of the invention. Co-pending application Ser. No. 09/318,282, ("the '282 application") having the same assignee as the present application and the contents of which are incorporated herein by reference, discloses a method in which the ground force signal, rather than an accelerometer that measures the movement of the plate or reaction mass of a vibrator, at a vibrator is measured by a suitable detector. This ground force signal includes a theoretical signal related to the driving signal for the vibrator and nonlinear noise, such as harmonic distortion. A filter is derived that converts the ground force signal to a desired short duration wavelet such as a Klauder wavelet or a minimum phase, band-limited impulse. This derived filter is applied to the recorded data to give the impulse response of the earth to the desired wavelet. In a particular embodiment of the '282 application, the filter relates the time derivative of the groundforce signal to the desired wavelet.

In the present invention, the ground force signal is recorded for both vibratory sources for both the low and high frequency sweeps and a separate filter is derived for each ground force signal. Each filter is separately applied to the recorded data to give results in a manner similar to those discussed above with reference to FIG. 5. These can then be combined by selecting suitable gates of data to give the response of the earth to the desired wavelet at the two different vibratory source positions.

While the foregoing disclosure is directed to the preferred embodiments of the invention, various modifications will be apparent to those skilled in the art. Specifically, the method discussed above may also be used with straightforward modifications to use with downsweep signals, i.e., signals in which the ending frequency is less than the beginning frequency. It is intended that all variations within the scope and spirit of the appended claims be embraced by the foregoing disclosure.

What is claimed is:

1. A method of acquiring seismic data using a plurality of seismic vibratory sources, the method comprising:
    (a) generating a plurality of sweep segments, each of said plurality of sweep segments including:
        (i) a first sweep having a start time, an ending time, a starting frequency and an ending frequency, and
        (ii) a second sweep having a start time less than the ending time of the first sweep, an ending time, a starting frequency substantially equal to the ending frequency of the first sweep, and an ending frequency;
    (b) using said plurality of sweep segments for driving said plurality of seismic vibratory sources, thereby generating a seismic signal that propagates into the earth;
    (c) recording uncorrelated seismic data resulting from reflections of said seismic signal from subterranean earth formations; and
    (d) processing said recorded uncorrelated seismic data to obtain information about the subterranean earth formations.

2. The method of claim 1 wherein the number of seismic vibratory source is equal to the number of sweep segments.

3. The method of claim 1 wherein processing said uncorrelated seismic data further comprises correlating the uncorrelated seismic data with the first sweep to give a first correlated data set.

4. The method of claim 3 wherein processing said uncorrelated seismic data further comprises correlating the uncorrelated seismic data with the second sweep to give a second correlated data set.

5. The method of claim 4 wherein the plurality of vibratory sources is two, further comprising combining the first and second correlated data sets for obtaining a first and a second composite data set representative of data associated with the first and second vibratory sources respectively.

6. The method of claim 5 wherein using said plurality of sweep segments for driving the vibratory sources further comprises, in sequential order:
    (i) driving a first of the two seismic vibratory sources with the first sweep of the first pair of sweep segments;
    (ii) driving a second of the two seismic vibratory sources with the second sweep of the first pair of sweep signals;
    (iii) driving the second of the two vibratory sources with the first sweep of the second pair of sweep signals; and
    (iv) driving the first of the two vibratory sources with the second sweep of the second pair of sweep signals.

7. The method of claim 1 wherein each of the plurality of vibratory sources comprises a plurality of vibrators.

8. The method of claim 6 further comprising recording a reference signal corresponding to each said sweep at each of the plurality of vibratory sources, each said reference signal indicative of one of (A) a motion of a reaction mass of a vibratory source, (B) a motion of a base plate of a vibratory source, and, (C) a ground force signal, thereby giving a plurality of reference signals.

9. The method of claim 8 wherein processing said uncorrelated data further comprises deriving a plurality of filters for relating each of said plurality of reference signals to a desired wavelet and applying the derived filters to the uncorrelated data to give a plurality of filtered data sets.

10. The method of claim 9 wherein the plurality of vibratory sources and the plurality of sweep segments is two.

11. The method of claim 9 wherein processing the data further comprises combining the plurality of filtered data sets.

12. The method of claim 1 wherein the ending frequency of the first sweep is greater than the starting frequency of the first sweep, and the ending frequency of the second sweep is greater than the starting frequency of the second sweep.

13. The method of claim 12 wherein the start time of the second sweep is greater than a time at which a frequency of a second harmonic of the first sweep is substantially equal to the starting frequency of the second sweep.

14. The method of claim 1 wherein the ending frequency of the first sweep is less than the starting frequency of the first sweep, and the ending frequency of the second sweep is less than the starting frequency of the second sweep.

* * * * *